United States Patent [19]

Dehnert et al.

[11] Patent Number: 4,650,860
[45] Date of Patent: Mar. 17, 1987

[54] BENZISOTHIAZOLAZO, DIAMINOPYRIDINE DYES

[75] Inventors: Johannes Dehnert, Ludwigshafen; Gunther Lamm, Hassloch, both of Fed. Rep. of Germany

[73] Assignee: BASF Aktiengesellschaft, Fed. Rep. of Germany

[21] Appl. No.: 748,709

[22] Filed: Jun. 26, 1985

Related U.S. Application Data

[63] Continuation of Ser. No. 454,246, Dec. 29, 1982, abandoned.

[30] Foreign Application Priority Data

Jan. 16, 1982 [DE] Fed. Rep. of Germany ....... 3201268

[51] Int. Cl.$^4$ .................. C09B 29/042; C09B 29/42; D06P 1/18; D06P 3/54
[52] U.S. Cl. .................................. 534/766; 534/573; 534/768; 534/773
[58] Field of Search ............................... 534/733, 766

[56] References Cited

U.S. PATENT DOCUMENTS

| | | | |
|---|---|---|---|
| 3,998,802 | 12/1976 | Dehnert et al. | 260/156 |
| 4,016,152 | 4/1977 | Dehnert et al. | 260/156 |
| 4,042,578 | 8/1977 | Dehnert et al. | 260/156 |
| 4,128,545 | 12/1978 | Dehnert et al. | 260/156 |
| 4,146,535 | 3/1979 | Dehnert et al. | 260/156 |
| 4,150,943 | 4/1979 | Dehnert et al. | 260/156 |

FOREIGN PATENT DOCUMENTS 2349373 4/1975 Fed. Rep. of Germany ...... 260/156

Primary Examiner—Floyd D. Higel

Attorney, Agent, or Firm—Oblon, Fisher, Spivak, McClelland & Maier

[57] ABSTRACT

A compound having the formula:

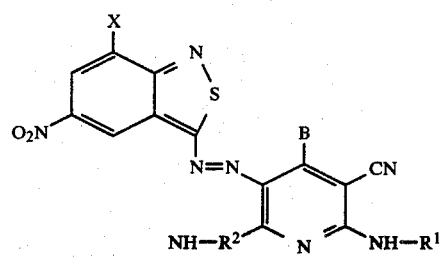

where X is hydrogen, chlorine or bromine, B is hydrogen, methyl, ethyl or propyl, and one of the radicals $R^1$ or $R^2$ is phenyl which is unsubstituted or mono- or polysubstituted by chlorine, methyl, ethyl, t-butyl, phenoxy, methoxy, ethoxy, propoxy or butoxy, and the other is $C_2$–$C_8$-alkyl which is unsubstituted or substituted by $C_1$–$C_8$-alkoxy or phenyl, or is allyl, cyclopentyl, cyclohexyl, methylcyclohexyl,

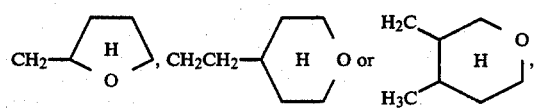

The compounds of formula (I) are used as dyes, preferably for cellulose and cellulose-containing fabrics.

13 Claims, No Drawings

BENZISOTHIAZOLAZO, DIAMINOPYRIDINE DYES

This application is a continuation of application Ser. No. 454,246, filed Dec. 29, 1982, now abandoned.

SUMMARY OF THE INVENTION

Azo dye having either 2-arylamino-5-cyano-6-alkylamino- or 2-alkylamino-5-cyano-6-arylamino-pyridine as coupling component general formula I

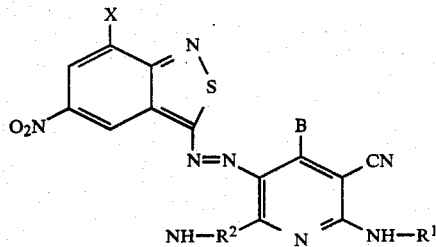

where X is hydrogen, chlorine or bromine, B is hydrogen, methyl, ethyl or propyl, and one of the radicals $R^1$ or $R^2$ is phenyl which is unsubstituted or mono- or poly-substituted by chlorine, methyl, ethyl, t-butyl, phenoxy, methoxy, ethoxy, propoxy or butoxy, and the other is $C_2$–$C_8$-alkyl which is unsubstituted or substituted by $C_1$–$C_8$-alkoxy or phenyl, or is allyl, cyclopentyl, cyclohexyl, methylcyclohexyl,

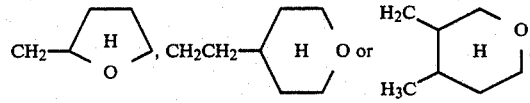

DETAILED DESCRIPTION OF THE PREFERRED EMBODIMENTS

Specific examples of alkyl radicals $R^1$ and $R^2$ are $C_2H_5$, n—$C_3H_7$, i—$C_3H_7$, n— or i—$C_4H_9$, n— or i—$C_5H_{11}$, n— or i—$C_6H_{13}$, n— or i—$C_7H_{15}$, n— or i—$C_8H_{17}$, $C_2H_4OCH_3$, $C_2H_4OC_2H_5$, $C_2H_4OC_3H_7$, $C_2H_4OC_4H_9$, $(CH_2)_3OCH_3$, $C_2H_4OCH(CH_3)_2$, $(CH_2)_3OC_2H_5$, $(CH_2)_3OC_3H_7$, $(CH_2)_3OC_4H_9$, $(CH_2)_3OC_6H_{13}$, $(CH_2)_3OC_8H_{17}$,

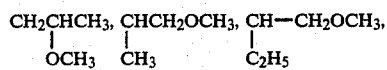

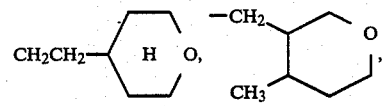

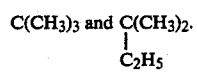

The compounds of the formula I can be prepared by reacting a diazo compound of an amine of the formula

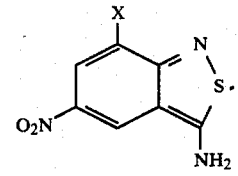

with a coupling component of the formula

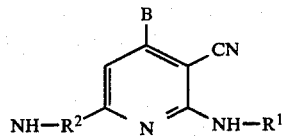

in a conventional manner. Details may be found in the Examples, in which parts and percentages, unless indicated otherwise, are by weight.

The compounds of the formula I are preferably used for fixative printing (known under the tradename DYBLN, cf. eg. German Pat. No. 1,811,796 or U.S. Pat. No. 3,706,525), in which tone-on-tone dyeings can be produced on mixtures of cellulose fibers and polyester. Blue to black dyeings with very good fastness characteristics in comparison with conventional dyes, in particular lightfastness and wetfastness, and also a high stability to live steam, are obtained.

Particularly important compounds are those of the formula I a

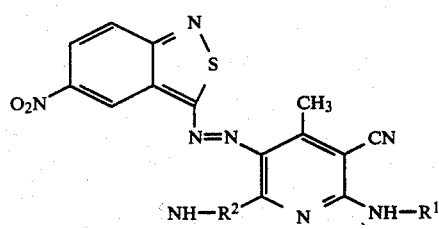

where $R^1$ and $R^2$ have the above meanings, but $R^2$ is preferably and $R^1$ is preferably

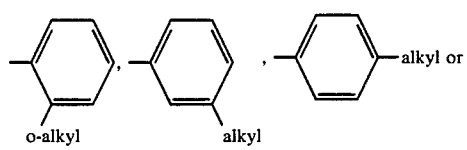

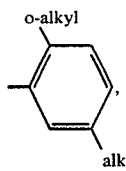

always in combination with an unsubstituted or substituted alkyl radical of the type defined, and alkyl is methyl, ethyl or t-butyl.

Examples of preferred unsubstituted or substituted radicals $R^1$ and $R^2$ are —CH(CH$_3$)$_2$,

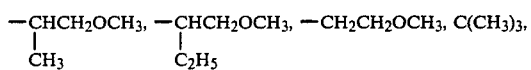

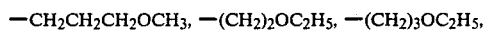

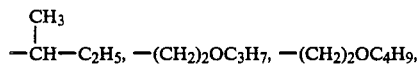

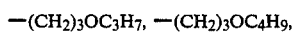

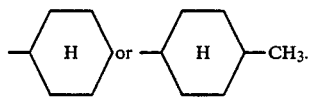

Combinations where $R^1$ is $C_6H_5$ and $R^2$ is

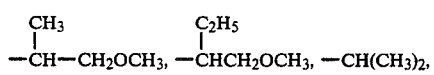

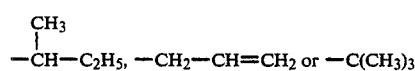

are also preferred.

EXAMPLE 1

19.6 parts of the diazo component of the formula

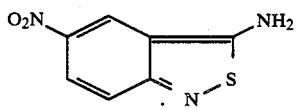

are prepared and diazotized with nitrosylsulfuric acid, by the process described in German Pat. No. 2,412,975. The finished diazonium salt solution is then run into a suspension of 31.1 parts of the coupling component of the formula

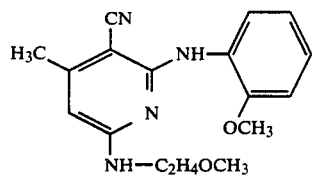

in a mixture of 400 parts of water and 900 parts of ice. About 30% strength sodium formate solution is added to the coupling mixture, until the pH of the suspension has risen to 0.3–0.7, during which time the temperature is kept at below +5° C. by addition of ice. The coupling has ended after about 30 minutes, and the precipitated dye is isolated, washed salt-free and dried, in a conventional manner. 49 parts of a bluish black powder of the formula

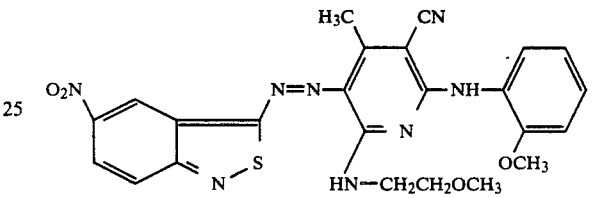

are obtained. The dye melts at from 225° C. to 230° C. and dyes cotton, polyester and polyester/cotton union fabric in lightfast reddish blue to navy shades.

If, instead of the above coupling component, the coupling component mixture formed when 2,6-dichloro-3-cyano-4-methylpyridine is reacted first with 2-methoxyethylamine and then with 2-methoxyaniline, as described in German Pat. No. 2,260,827, is used, the corresponding amount of a dye mixture is obtained which, in addition to the above dye, contains a minor amount of the dye of the formula

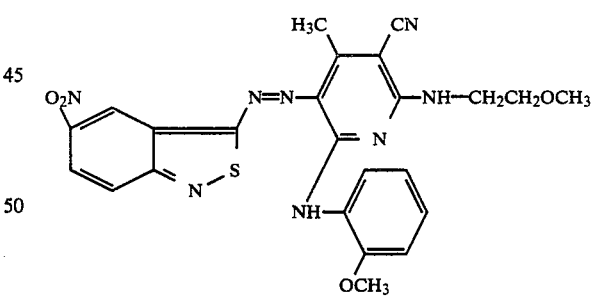

The mixture melts at from 185° to 229° C.,

The absorption maximum of a solution of the dye in dimethylformamide (about 10 mg/l) is 589.5 nm.

The dye mixture dyes or prints cotton, polyester and polyester/cotton union fabric in highly lightfast clear blue to navy hues at a slightly lower temperature than the pure dyes. The dyeings or prints have good wetfastness, even when the hues are deep, and they are also stable to hot steam.

An example of a suitable dyeing method is the procedure described in European Pat. No. 0,012,935, and an example of a suitable printing method is that of German Pat. No. 1,811,796.

EXAMPLE 2

27.5 parts of the diazo component of the formula

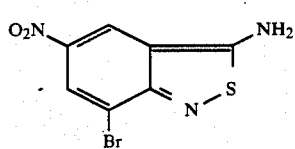

are stirred into 200 parts of 96–98% strength sulfuric acid at from 10° to 15° C. The mixture is then cooled to 0°–10° C., and a mixture of 100 parts by volume of glacial acetic acid and 17 parts of propionic acid is added dropwise at this temperature. 33 parts of 42–44% strength nitrosylsulfuric acid solution is then added dropwise at 0°–4° C. in the course of from 20 to 30 minutes, with cooling. The diazotization mixture is subsequently stirred at from 0° to 4° C. for from 3½ to 4 hours, and is then run, with stirring, into a suspension of 31.1 parts of the mixture of coupling components of the formulae

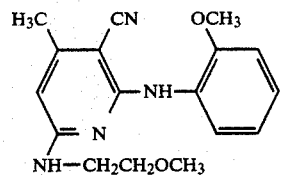

and

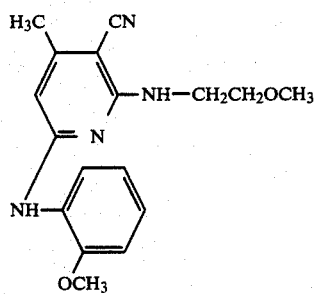

which is described in Example 1, in a mixture of 400 parts of water and 900 parts of ice.

After the diazonium salt solution has been added, the pH of the coupling mixture is increased to 0.5–10 with approximately 30% strength sodium formate solution, during which the temperature is kept at from −3° to +5° C. by addition of ice.

The reacted coupling mixture is heated to 85° C. with steam and is kept at from 85° to 95° C. for 15–30 minutes, and the precipitated dye is washed salt-free in a conventional manner and dried to give 57 parts of a black powder of the formulae

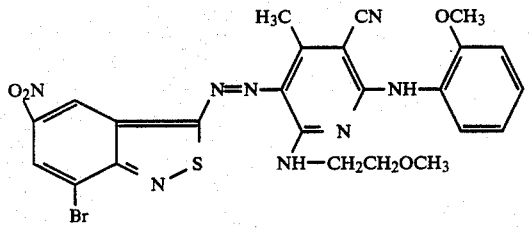

and

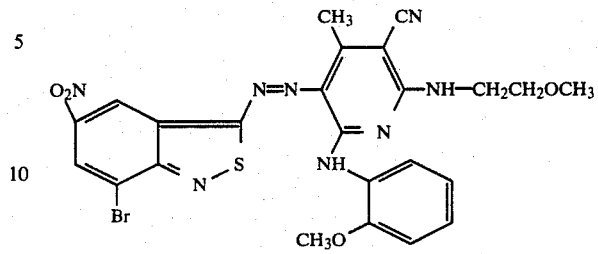

The mixing ratio of the dyes is the same as that of the coupling components used.

The dye mixture is soluble in dimethylformamide, giving a blue solution, and dyes or prints cotton, polyester or polyester/cotton union fabric in blue to navy hues. The resulting dyeings or prints have good lightfastness and wetfastness.

EXAMPLE 3

19.6 parts of the diazo component of the formula

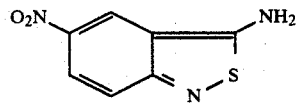

are prepared and diazotized by the process described in German Pat. No. 2,412,975. The diazonium salt solution is then run into a suspension of a mixture of 20.6 parts of the coupling component of the formula

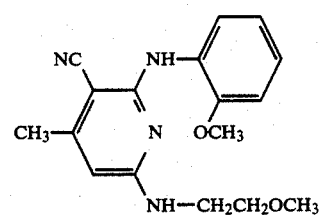

and 9.8 parts of the coupling component of the formula

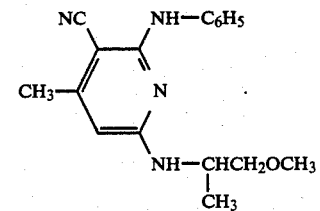

(which, because of the method of synthesis, each contain a relatively small amount of the 2,6-isomeric coupling component) in a mixture of 400 parts of water and 900 parts of ice. The individual coupling components are prepared from 2,6-dichloro-3-cyano-4-methylpyridine by a method similar to that described in German Pat. No. 2,260,827, by reacting the heterocyclic compound first with the aliphatic amine and then, in a second step, with the aromatic amine.

The coupling is brought to completion by a procedure similar to that described in Example 1, and the dye is worked up in a conventional manner. 47.5 parts of dye powder are isolated. A dye mixture is obtained, containing individual components of the formulae

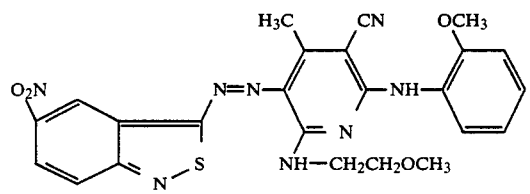

and

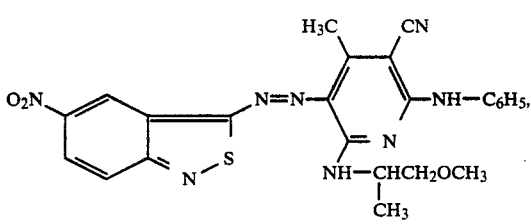

and relatively small amounts of

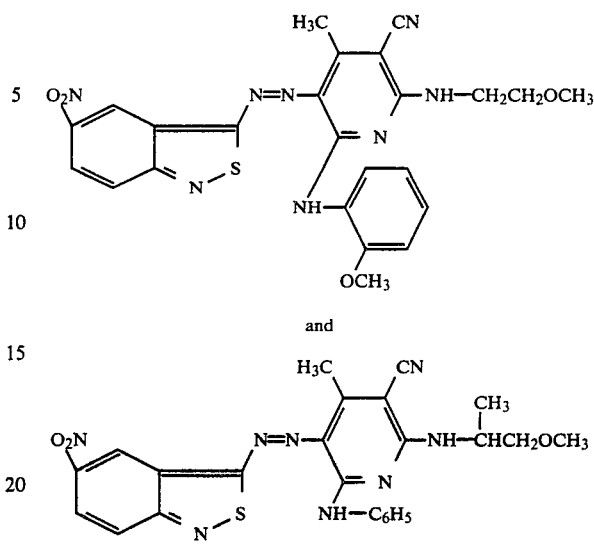

The dye mixture melts in the range from 185° to 198° C. and its powder is bluish black and dissolves in dimethylformamide giving a blue solution.

Pale dyeings or prints on polyester, cotton or polyester/cotton union fabrics are reddish blue, whilst deeper dyeings are clear navy.

The dye mixture dyes polyester and cotton with a good matching of hue. The dyeings have good fastness characteristics in use.

The dyes listed in the Tables can be prepared by a procedure similar to that described in the Examples. Where two hues are given for dyeings or prints, the first refers to a lighter dyeing (or print) using about 0.2–0.4% of dye, and the second refers to a dyeing (or print) using not less than 0.8% of dye.

TABLE 1

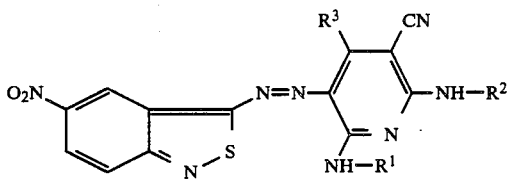

| No. | R$^1$ | R$^2$ | R$^3$ | Hue |
|---|---|---|---|---|
| 4 | —CH(CH$_3$)—CH$_2$OCH$_3$ | C$_6$H$_5$ | CH$_3$ | reddish blue navy |
| 5 | —CH(C$_2$H$_5$)—CH—OCH$_3$ | " | " | " |
| 6 | —CH$_2$CH$_2$-(tetrahydropyran) | " | " | " |
| 7 | (methyltetrahydropyran) | " | " | " |
| 8 | C$_2$H$_4$OC$_2$H$_5$ | " | " | " |

TABLE 1-continued

[Structure: O₂N-substituted benzoisothiazole-N=N-pyridine with R³, CN, NH-R², NH-R¹ substituents]

| No. | R¹ | R² | R³ | Hue |
|---|---|---|---|---|
| 9 | CH(C₆H₅)—CH₃ | " | " | " |
| 10 | C₂H₄OC₃H₇(n) | " | " | " |
| 11 | C₂H₄OC₄H₉(n) | " | " | " |
| 12 | cyclohexyl-H | " | " | " |
| 13 | C₃H₆OCH₃ | " | " | " |
| 14 | C₃H₆OC₂H₅ | " | " | " |
| 15 | —CH(C₂H₅)C₄H₉(n) | " | " | " |
| 16 | CH₂CH(C₂H₅)—C₄H₉(n) | " | " | " |
| 17 | CH(CH₃)—C₂H₅ | " | " | " |
| 18 | —CH(CH₃)—CH₂OCH₃ | " | 4-Cl-C₆H₄ | " |
| 19 | —CH(C₂H₅)—CH₂—OCH₃ | " | " | " |
| 20 | —CH₂CH₂-(tetrahydropyran-4-yl) | " | " | " |
| 21 | 3,4-dimethyltetrahydropyranyl | " | " | " |
| 22 | C₂H₄OC₂H₅ | " | " | " |
| 23 | C₂H₄OC₃H₇(n) | " | " | " |
| 24 | C₂H₄OC₄H₉(n) | " | " | " |
| 25 | cyclohexyl-H | " | " | " |
| 26 | C₃H₆OCH₃ | " | " | blue navy |
| 27 | C₃H₆OC₂H₅ | " | " | " |
| 28 | CH₂CH(C₂H₅)—C₄H₉(n) | " | " | " |

TABLE 1-continued

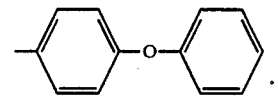

| No. | R¹ | R² | R³ | Hue |
|---|---|---|---|---|
| 29 | CH(CH₃)—CH₂OCH₃ | 4-phenoxyphenyl | " | " |
| 30 | C₂H₄OCH₃ | " | " | " |
| 31 | C₃H₆OCH₃ | " | " | " |
| 32 | 2-methoxyphenyl | CH₂CH=CH₂ | " | " |
| 33 | —CH(CH₃)—CH₂OCH₃ | 3-chlorophenyl | " | " |
| 34 | —CH(C₂H₅)—CH—OCH₃ | | " | " |
| 35 | —CH₂CH₂-(tetrahydropyran-4-yl) | " | " | " |
| 36 | 3,4-dimethyl-tetrahydropyran-... | " | " | " |
| 37 | C₂H₄OC₂H₅ | " | " | " |
| 38 | C₂H₄OC₃H₇(n) | " | " | " |
| 39 | C₂H₄OC₄H₉(n) | " | " | " |
| 40 | C₃H₆OCH₃ | " | " | " |
| 41 | C₃H₆OC₂H₅ | " | " | " |
| 42 | CH₂CH(C₂H₅)—C₄H₉(n) | " | " | " |
| 43 | C₃H₆OCH₃ | 2,5-dimethylphenyl | " | dull blue bluish black |
| 44 | CH(CH₃)CH₂OCH₃ | " | " | " |
| 45 | CH₂CH₂-(tetrahydropyran-4-yl) | " | " | " |

TABLE 1-continued

[Structure: O$_2$N-substituted benzisothiazole-N=N-pyridine with R$^3$, CN, NH-R$^2$, NH-R$^1$ substituents]

| No. | R$^1$ | R$^2$ | R$^3$ | Hue |
|---|---|---|---|---|
| 46 | -CH(CH$_3$)-CH$_2$OCH$_3$ | 3-methylphenyl | " | greenish blue bluish black |
| 47 | -CH(C$_2$H$_5$)-CH-OCH$_3$ | " | " | " |
| 48 | -CH$_2$CH$_2$-(tetrahydropyran-4-yl) | " | " | " |
| 49 | 3-methyl-4-methyl-tetrahydropyran-H | " | " | " |
| 50 | C$_2$H$_4$OC$_2$H$_5$ | " | " | " |
| 51 | CH(CH$_3$)(C$_6$H$_5$) | " | " | " |
| 52 | C$_2$H$_4$OC$_3$H$_7$(n) | " | " | " |
| 53 | C$_2$H$_4$OC$_4$H$_9$(n) | " | " | " |
| 54 | cyclohexyl-H | " | " | " |
| 55 | C$_3$H$_6$OCH$_3$ | " | " | " |
| 56 | C$_3$H$_6$OC$_2$H$_5$ | " | " | " |
| 57 | CH$_2$CH$_2$OCH$_3$ | " | " | dull blue bluish black |
| 58 | C$_3$H$_6$OCH$_3$ | " | H | " |
| 59 | -CH(CH$_3$)-CH$_2$OCH$_3$ | OCH$_3$, 2-methoxy-methylphenyl | CH$_3$ | " |
| 60 | -CH(C$_2$H$_5$)-CH-OCH$_3$ | " | " | " |
| 61 | -CH$_2$-CH$_2$-(tetrahydropyran-4-yl) | " | " | " |
| 62 | 3-methyl-4-methyl-tetrahydropyran-H | " | " | " |
| 63 | C$_2$H$_4$OC$_2$H$_5$ | " | " | " |
| 64 | C$_2$H$_4$OC$_3$H$_7$(n) | " | " | " |
| 65 | C$_2$H$_4$OC$_4$H$_9$(n) | " | " | " |

TABLE 1-continued $O_2N$—[benzisothiazole]—$N=N$—[pyridine with $R^3$, CN, $NH-R^2$, $NH-R^1$ substituents]

| No. | R¹ | R² | R³ | Hue |
|---|---|---|---|---|
| 66 | cyclohexyl (—CH<) | " | " | " |
| 67 | $C_3H_6OCH_3$ | " | " | " |
| 68 | $C_3H_6OC_2H_5$ | " | " | " |
| 69 | $C_2H_4OCH_3$ | " | " | " |
| 70 | $C_3H_6OCH_3$ | " | H | " |
| 71 | " | " | $C_2H_5$ | " |
| 72 | $C_4H_9(n)$ | " | $CH_3$ | " |
| 73 | $C_3H_6OCH_3$ | 2,5-dimethyl-4-methoxyphenyl (with $CH_3$ and $OCH_3$) | " | " |
| 74 | —CH(CH₃)—CH₂OCH₃ | 4-methoxyphenyl (—⟨⟩—$OCH_3$) | " | bluish grey coal black |
| 75 | —CH($C_2H_5$)—CH₂—OCH₃ | " | " | " |
| 76 | —CH₂CH₂—(tetrahydropyran-4-yl) | " | " | " |
| 77 | (2-methyl-tetrahydropyran-4-yl, $H_3C$—) | " | " | " |
| 78 | $C_2H_4OC_2H_5$ | " | " | " |
| 79 | $C_2H_4OC_3H_7(n)$ | " | " | " |
| 80 | $C_2H_4OC_4H_9(n)$ | " | " | " |
| 81 | cyclohexyl (—CH<) | " | " | " |
| 82 | $C_3H_6OCH_3$ | " | " | " |
| 83 | $C_3H_6OC_2H_5$ | " | " | " |
| 84 | —CH($C_2H_5$)$C_4H_9(n)$ | | | |
| 85 | CH₂CH($C_2H_5$)—$C_4H_9(n)$ | " | " | " |
| 86 | —CH($CH_3$)—$C_2H_5$ | " | " | " |

TABLE 1-continued
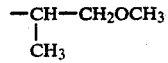
| No. | R¹ | R² | R³ | Hue |
|---|---|---|---|---|
| 87 | $C_2H_4OCH_3$ | " | " | " |
| 88 | $C_3H_6OCH(CH_3)_2$ | " | " | " |
| 89 | $C_3H_6OC_8H_{17}(i)$ | " | " | " |
| 90 | $C_3H_6OCH_3$ | " | H | " |
| 91 | " | " | $C_2H_5$ | " |
| 92 | $C_3H_6OC_2H_5$ | " | H | " |
| 93 | —CH(CH₃)—CH₂OCH₃ | 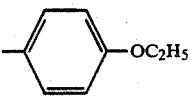 -OC₂H₅ | $CH_3$ | dull blue coal black |
| 94 | —CH(C₂H₅)—CH—OCH₃ | " | " | " |
| 95 | 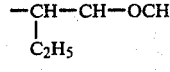 | " | " | " |
| 96 | 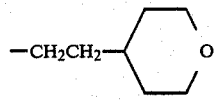 | " | " | " |
| 97 | $C_2H_4OC_2H_5$ | " | " | " |
| 98 | CH(C₆H₅)—CH₃ | " | " | " |
| 99 | $C_2H_4OC_3H_7(n)$ | " | " | " |
| 100 | $C_2H_4OC_4H_9(n)$ | " | " | " |
| 101 | 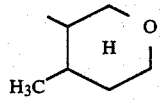 | " | " | " |
| 102 | $C_3H_6OCH_3$ | " | " | " |
| 103 | $C_3H_6OC_2H_5$ | " | " | " |
| 104 | —CH(C₂H₅)C₄H₉(n) | " | " | " |
| 105 | CH₂CH(C₂H₅)—C₄H₉(n) | " | " | " |
| 106 | CH(CH₃)—C₂H₅ | " | " | " |
| 107 | $C_2H_4OCH_3$ | " | " | " |

TABLE 1-continued

Structure: 5-nitro-benzisothiazole-azo-pyridine with R³, CN, NH-R², NH-R¹ substituents

| No. | R¹ | R² | R³ | Hue |
|---|---|---|---|---|
| 108 | C₃H₆OCH₃ | 2-Cl-4-methyl-5-methoxy-phenyl (with OCH₃, OCH₃) | " | bluish grey coal black |

TABLE 2

Structure: 5-nitro-benzisothiazole (with R³ substituent on benzo ring) azo pyridine with H₃C, CN, NH-R², NH-R¹

| No. | R¹ | R² | R³ | Hue |
|---|---|---|---|---|
| 109 | CHCH₂OCH₃ / CH₃ | 2-OCH₃-phenyl | H | blue navy |
| 110 | CH—CH₂OCH₃ / C₂H₅ | " | " | blue navy |
| 111 | CH₂CH₂-(tetrahydropyran-4-yl) | " | " | blue navy |
| 112 | 3-methyl-tetrahydropyran-4-yl | " | " | blue navy |
| 113 | C₂H₄OC₂H₅ | " | " | blue navy |
| 114 | CH—CH₃ / C₆H₅ | " | " | blue navy |
| 115 | CH₂CH₂—C₆H₅ | " | " | blue navy |
| 116 | CH₂CH—C₆H₅ / CH₃ | " | " | blue navy |
| 117 | C₂H₄OC₃H₇(n) | " | " | blue navy |
| 118 | C₂H₄OC₃H₇(i) | 2-OCH₃-phenyl | H | blue navy |
| 119 | C₂H₄OC₄H₉(n) | " | " | blue |
| 120 | C₃H₆OCH₃ | " | " | navy blue |
| 121 | C₃H₆OC₂H₅ | " | " | navy blue |
| 122 | C₃H₆OC₃H₇(n) | " | " | navy blue |
| 123 | C₃H₆OC₈H₁₇(i) | " | " | navy blue |
| 124 | CH₂CHC₄H₉(n) / C₂H₅ | " | " | blue navy |
| 125 | 3-methyl-tetrahydropyran-4-yl | " | Cl | blue navy |
| 126 | CHCH₂OCH₃ / CH₃ | 2-OC₂H₅-phenyl | H | blue navy |
| 127 | CH—CH₂OCH₃ / C₂H₅ | " | Cl | blue |
| 128 | CH₂CH₂-(tetrahydropyran-4-yl) | " | " | " |
| 129 | 3-methyl-tetrahydropyran-4-yl | " | " | " |
| 130 | C₂H₄OC₂H₅ | 2-OC₂H₅-phenyl | H | blue navy |

TABLE 2-continued

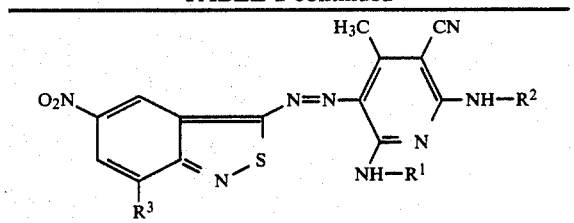

| No. | R¹ | R² | R³ | Hue |
|---|---|---|---|---|
| 131 | $C_2H_4OC_3H_7(n)$ | " | " | blue navy |
| 132 | $C_2H_4OC_3H_7(i)$ | " | " | blue navy |
| 133 | $C_2H_4OC_4H_9(n)$ | " | " | blue navy |
| 134 | $C_3H_6OCH_3$ | " | " | blue navy |
| 135 | $C_3H_6OC_2H_5$ | " | " | blue navy |
| 136 | $C_3H_6OC_3H_7(n)$ | " | " | blue navy |
| 137 | $C_3H_6OC_8H_{17}(i)$ | " | " | blue navy |
| 138 | CHCH₂OCH₃ / CH₃ | (2,4-dimethyl-methoxyphenyl) | " | navy bluish black |
| 139 | CH—CH₂OCH₃ / C₂H₅ | " | " | navy bluish black |
| 140 | CH₂CH₂-(tetrahydropyran) | " | " | navy bluish black |
| 141 | (methyl-tetrahydropyran) | " | " | navy bluish black |
| 142 | $C_2H_4OC_2H_5$ | " | " | navy bluish black |
| 143 | $C_2H_4OC_3H_7(n)$ | (2,4-dimethyl-methoxyphenyl) | H | navy bluish black |
| 144 | $C_2H_4OC_3H_7(i)$ | " | " | navy bluish black |
| 145 | $C_2H_4OC_4H_9(n)$ | " | " | navy bluish black |
| 146 | $C_3H_6OCH_3$ | " | " | navy bluish black |
| 147 | $C_3H_6OC_2H_5$ | " | " | navy bluish black |
| 148 | $C_3H_6OC_3H_7(n)$ | " | " | navy bluish black |
| 149 | $CH(CH_3)_2$ | " | " | blue navy |

TABLE 2-continued

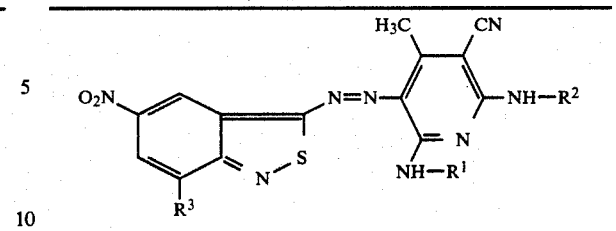

| No. | R¹ | R² | R³ | Hue |
|---|---|---|---|---|
| 150 | CHCH₂OCH₃ / CH₃ | (methylphenyl) | H | blue navy |
| 151 | CH—CH₂OCH₃ / C₂H₅ | " | " | blue navy |
| 152 | CH₂CH₂-(tetrahydropyran) | " | " | blue navy |
| 153 | (methyl-tetrahydropyran) | " | " | blue navy |
| 154 | $C_2H_4OC_2H_5$ | " | " | blue navy |
| 155 | $C_2H_4OC_3H_7(n)$ | " | " | blue navy |
| 156 | $C_2H_4OC_3H_7(i)$ | (methylphenyl) | H | blue navy |
| 157 | $C_2H_4OC_4H_9(n)$ | " | " | blue navy |
| 158 | $C_3H_6OCH_3$ | " | " | blue navy |
| 159 | $C_3H_6OC_2H_5$ | " | " | blue navy |
| 160 | $C_3H_6OC_3H_7(n)$ | " | " | blue navy |
| 161 | $C_3H_6OC_8H_{17}(i)$ | " | " | blue navy |
| 162 | cyclohexyl | (methoxyphenyl) | " | navy |
| 163 | methylcyclohexyl | " | " | " |
| 164 | CHCH₂OCH₃ / CH₃ | (methylphenyl) | " | greenish blue navy |
| 165 | CH—CH₂OCH₃ / C₂H₅ | " | " | greenish blue navy |
| 166 | CH₂CH₂-(tetrahydropyran) | " | " | greenish blue navy |

TABLE 2-continued

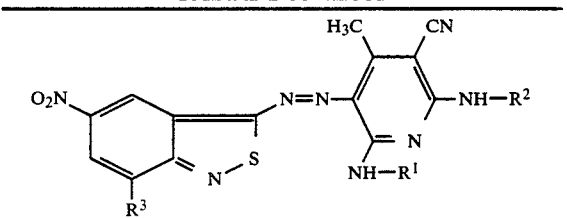

| No. | R¹ | R² | R³ | Hue |
|---|---|---|---|---|
| 167 | (CH₃)₂CH-CH₂-CH(CH₃)-, H | " | " | greenish blue navy |
| 168 | $C_2H_4OC_2H_5$ | " | " | greenish blue navy |
| 169 | CH(CH₃)(C₆H₅) | -C₆H₄-CH₃ (m) | H | greenish blue navy |
| 170 | $CH_2CH_2-C_6H_5$ | " | " | greenish blue navy |
| 171 | CH₂CH(CH₃)-C₆H₅ | " | " | greenish blue navy |
| 172 | $C_2H_4OC_3H_7(n)$ | " | " | greenish blue navy |
| 173 | $C_2H_4OC_3H_7(i)$ | " | " | greenish blue navy |
| 174 | $C_2H_4OC_4H_9(n)$ | " | " | greenish blue navy |
| 175 | $C_3H_6OCH_3$ | " | " | greenish blue navy |
| 176 | $C_3H_6OC_2H_5$ | " | " | greenish blue navy |
| 177 | $C_3H_6OC_3H_7(n)$ | " | " | greenish blue navy |
| 178 | $C_3H_6OC_8H_{17}(i)$ | " | " | greenish blue navy |
| 179 | CH₂CH(C₂H₅)C₄H₉(n) | " | " | greenish blue navy |
| 180 | $C_2H_4OCH_3$ | " | " | greenish blue navy |
| 181 | CH(CH₃)CH₂OCH₃ | -C₆H₄-CH₃ | " | blue navy |
| 182 | CH(C₂H₅)-CH₂OCH₃ | " | " | blue navy |
| 183 | CH₂CH₂-(tetrahydropyranyl) | -C₆H₄-CH₃ | H | blue navy |

TABLE 2-continued

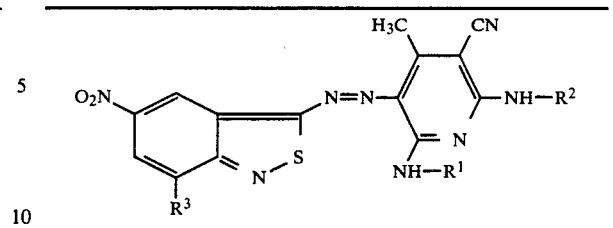

| No. | R¹ | R² | R³ | Hue |
|---|---|---|---|---|
| 184 | (CH₃)CH-CH(CH₃)-CH₂-(tetrahydropyranyl) | " | " | blue navy |
| 185 | $C_2H_4OC_2H_5$ | " | " | blue navy |
| 186 | $CH_2CH_2-C_6H_5$ | " | " | blue navy |
| 187 | CH₂CH(CH₃)-C₆H₅ | " | " | blue navy |
| 188 | $C_2H_4OC_3H_7(n)$ | " | " | blue navy |
| 189 | $C_2H_4OC_3H_7(i)$ | " | " | blue navy |
| 190 | $C_2H_4OC_4H_9(n)$ | " | " | blue navy |
| 191 | $C_3H_6OCH_3$ | " | " | blue navy |
| 192 | $C_3H_6OC_2H_5$ | " | " | blue navy |
| 193 | $C_3H_6OC_3H_7(n)$ | " | " | blue navy |
| 194 | $C_3H_6OC_8H_{17}(i)$ | " | " | blue navy |
| 195 | CH₂CH(C₂H₅)C₄H₉(n) | " | " | blue navy |
| 196 | $C_2H_4OCH_3$ | " | " | blue navy |
| 197 | -C₆H₁₁ (cyclohexyl) | -C₆H₄-CH₃ (p) | H | blue navy |
| 198 | CH(CH₃)CH₂OCH₃ | -C₆H₄-OCH₃ (p) | " | blue navy |
| 199 | CH(C₂H₅)-CH₂OCH₃ | " | " | blue navy |
| 200 | CH₂CH₂-(tetrahydropyranyl) | " | " | blue navy |
| 201 | (CH₃)CH-CH(CH₃)-CH₂-(tetrahydropyranyl) | " | " | blue navy |
| 202 | $C_2H_4OC_2H_5$ | " | " | blue navy |
| 203 | $C_2H_4OC_3H_7(n)$ | " | " | blue navy |
| 204 | $C_2H_4OC_3H_7(i)$ | " | " | blue navy |
| 205 | $C_2H_4OC_4H_9(n)$ | " | " | blue navy |

TABLE 2-continued

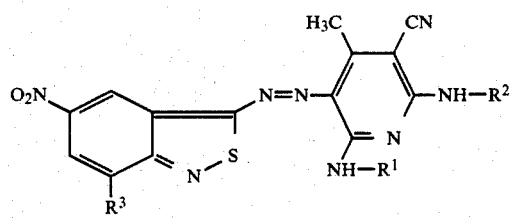

| No. | R¹ | R² | R³ | Hue |
|---|---|---|---|---|
| 206 | C₃H₆OCH₃ | " | " | blue navy |
| 207 | C₃H₆OC₂H₅ | " | " | blue navy |
| 208 | C₃H₆OC₃H₇(n) | " | " | blue navy |
| 209 | C₃H₆OC₈H₁₇(i) | " | " | blue navy |
| 210 | 2,4-(CH₃)₂-C₆H₃- | CH(CH₃)—CH₂OCH₃ | H | navy |
| 211 | " | C₃H₆OCH₃ | " | " |
| 212 | CH(CH₃)CH₂OCH₃ | 4-OC₂H₅-C₆H₄- | " | blue navy |
| 213 | CH(C₂H₅)—CH₂OCH₃ | " | " | blue navy |
| 214 | CH₂CH₂-tetrahydropyranyl | " | " | blue navy |
| 215 | 4-methyl-tetrahydropyranyl | " | " | blue navy |
| 216 | C₂H₄OC₂H₅ | " | " | blue navy |
| 217 | C₂H₄OC₃H₇(n) | " | " | blue navy |
| 218 | C₂H₄OC₃H₇(i) | " | " | blue navy |
| 219 | C₂H₄OC₄H₉(n) | " | " | blue navy |
| 220 | C₃H₆OCH₃ | " | " | blue navy |
| 221 | C₃H₆OC₂H₅ | " | " | blue navy |
| 222 | C₃H₆OC₃H₇(n) | " | " | blue navy |

TABLE 2-continued

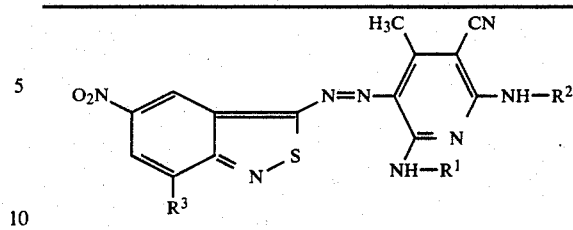

| No. | R¹ | R² | R³ | Hue |
|---|---|---|---|---|
| 223 | C(CH₃)₃ | 2-OCH₃-C₆H₄- | " | blue navy |
| 224 | C₆H₅ | CH(CH₃)—CH₂OCH₃ | " | blue navy |
| 225 | C₄H₉(n) | 4-C(CH₃)₃-C₆H₄- | " | blue navy |
| 226 | CH₂-tetrahydrofuranyl | C₆H₅ | " | blue navy |

We claim:
1. A benzisothiazolylazo dye of the formula

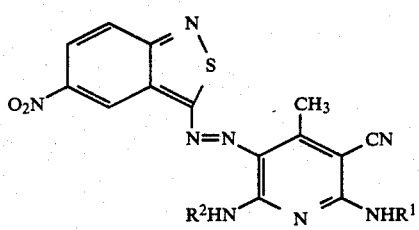

wherein one of R¹ or R² is phenyl substituted by methoxy, and the other R¹ or R² is methoxyethyl, ethoxyethyl, methoxypropyl, ethoxypropyl, —CH(C₂H₅)—CH₂OCH₃ or —CH(CH₃)—CH₂OCH₃.

2. The dye of claim 1, wherein R¹ is phenyl substituted by methoxy and R² is methoxyethyl.
3. The dye of claim 1, wherein R¹ is phenyl substituted by methoxy and R² is ethoxyethyl.
4. The dye of claim 1, wherein R¹ is phenyl substituted by methoxy and R² is methoxypropyl.
5. The dye of claim 1, wherein R¹ is phenyl substituted by methoxy and R² is ethoxypropyl.
6. The dye of claim 1, wherein R¹ is phenyl substituted by methoxy and R² is —CH(C₂H₅)—CH₂OCH₃.
7. The dye of claim 1, wherein R¹ is phenyl substituted by methoxy and R² is —CH(CH₃)—CH₂OCH₃.
8. The dye of claim 1, wherein R¹ is methoxyethyl and R² is phenyl substituted by methoxy.
9. The dye of claim 1, wherein R¹ is ethoxyethyl and R² is phenyl substituted by methoxy.
10. The dye of claim 1, wherein R¹ is methoxypropyl and R² is phenyl substituted by methoxy.
11. The dye of claim 1, wherein R¹ is ethoxypropyl and R² is phenyl substituted by methoxy.
12. The dye of claim 1, wherein R¹ is —CH(C₂H₅)—CH₂OCH₃ and R² is phenyl substituted by methoxy.
13. The dye of claim 1, wherein R¹ is —CH(CH₃)—CH₂OCH₃ and R² is phenyl substituted by methoxy.

* * * * *